(12) United States Patent
Hirata

(10) Patent No.: US 9,710,094 B2
(45) Date of Patent: Jul. 18, 2017

(54) TOUCH INPUTTING DEVICE CONTROLLING APPARATUS AND TOUCH INPUTTING DEVICE CONTROLLING METHOD

(71) Applicant: Sony Computer Entertainment Inc., Tokyo (JP)

(72) Inventor: Shinichi Hirata, Kanagawa (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 110 days.

(21) Appl. No.: 14/415,215

(22) PCT Filed: Jul. 23, 2013

(86) PCT No.: PCT/JP2013/004478
§ 371 (c)(1),
(2) Date: Jan. 16, 2015

(87) PCT Pub. No.: WO2014/017077
PCT Pub. Date: Jan. 30, 2014

(65) Prior Publication Data
US 2015/0177898 A1    Jun. 25, 2015

(30) Foreign Application Priority Data
Jul. 26, 2012    (JP) ................................. 2012-166304

(51) Int. Cl.
G06F 3/041    (2006.01)
G06F 3/047    (2006.01)

(52) U.S. Cl.
CPC ............ *G06F 3/0414* (2013.01); *G06F 3/047* (2013.01); *G06F 3/0412* (2013.01); *G06F 3/0416* (2013.01); *G06F 2203/04104* (2013.01)

(58) Field of Classification Search
CPC ....................................................... G06F 3/041
See application file for complete search history.

(56) References Cited

U.S. PATENT DOCUMENTS 9,342,202 B2    5/2016    Keskin
2009/0303196 A1    12/2009    Furukawa
(Continued)

FOREIGN PATENT DOCUMENTS

CN    102272706 A    12/2011
JP    2003216337 A    7/2003
(Continued)

OTHER PUBLICATIONS

International Preliminary Report on Patentability and Written Opinion for corresponding PCT Application PCT/JP2013/004478, 6 pages, dated Feb. 12, 2015.
(Continued)

*Primary Examiner* — Alexander Eisen
*Assistant Examiner* — Cory Almeida
(74) *Attorney, Agent, or Firm* — Matthew B. Dernier, Esq.

(57) ABSTRACT

A driving unit successively selects one drive line from among a plurality of drive lines of a touch inputting device and applies a driving voltage to the selected drive line. A voltage detection unit successively selects one sensing line from among a plurality of sensing lines and detects an output voltage of the selected sensing line. An arithmetic operation unit determines a resistance value of a pressure-sensitive resistive element provided at the location at which the selected drive line and the selected sensing line cross with each other based on the driving voltage and the output voltage. The driving unit applies 0 volts or a bias voltage equal to or lower than the driving voltage to the other drive lines than the selected drive line.

6 Claims, 16 Drawing Sheets

(56) References Cited

U.S. PATENT DOCUMENTS

| | | |
|---|---|---|
| 2010/0037709 A1 | 2/2010 | Yeh |
| 2010/0188345 A1 | 7/2010 | Keskin |
| 2011/0234508 A1 | 9/2011 | Oda |
| 2011/0260994 A1 | 10/2011 | Saynac |
| 2012/0162122 A1* | 6/2012 | Geaghan ............... G06F 3/0414 345/174 |

FOREIGN PATENT DOCUMENTS

| | | |
|---|---|---|
| JP | 2010026064 A | 2/2010 |
| JP | 2011209785 A | 10/2011 |
| JP | 2011243081 A | 12/2011 |
| JP | 2012515990 A | 7/2012 |
| WO | 2008026280 A1 | 3/2008 |

OTHER PUBLICATIONS

European Search Report for corresponding EP Application No. 13822683.2, 8 pages, dated Mar. 24, 2016.
Office Action corresponding JP Application No. 2012-166304, dated Jun. 23, 2015.
International Search Report for corresponding PCT Application No. PCT/2013/004478, dated Oct. 29, 2013.
Office Action for corresponding CN Application 2013800379577, 21 pages, dated Sep. 5, 2016.

\* cited by examiner

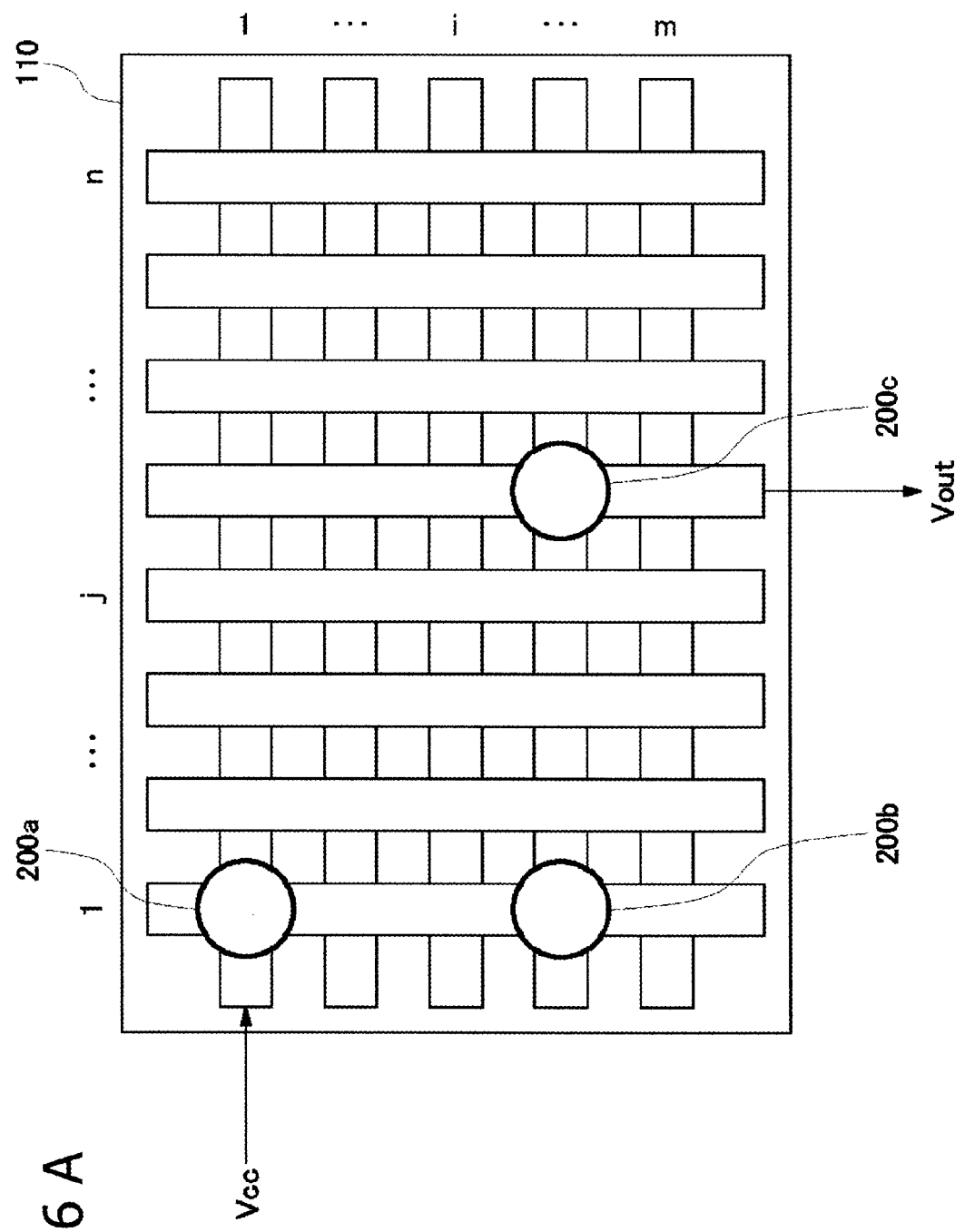

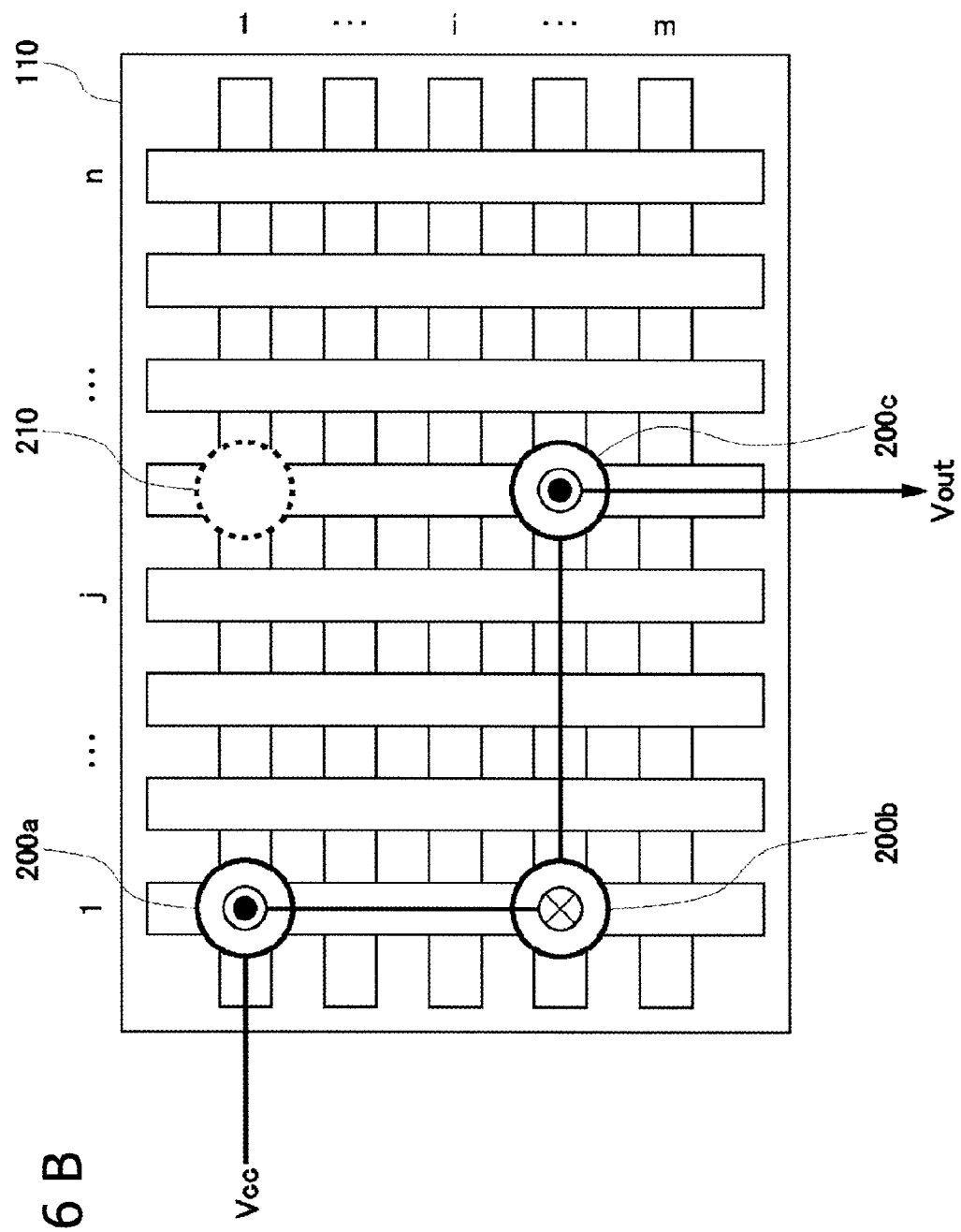

FIG. 9
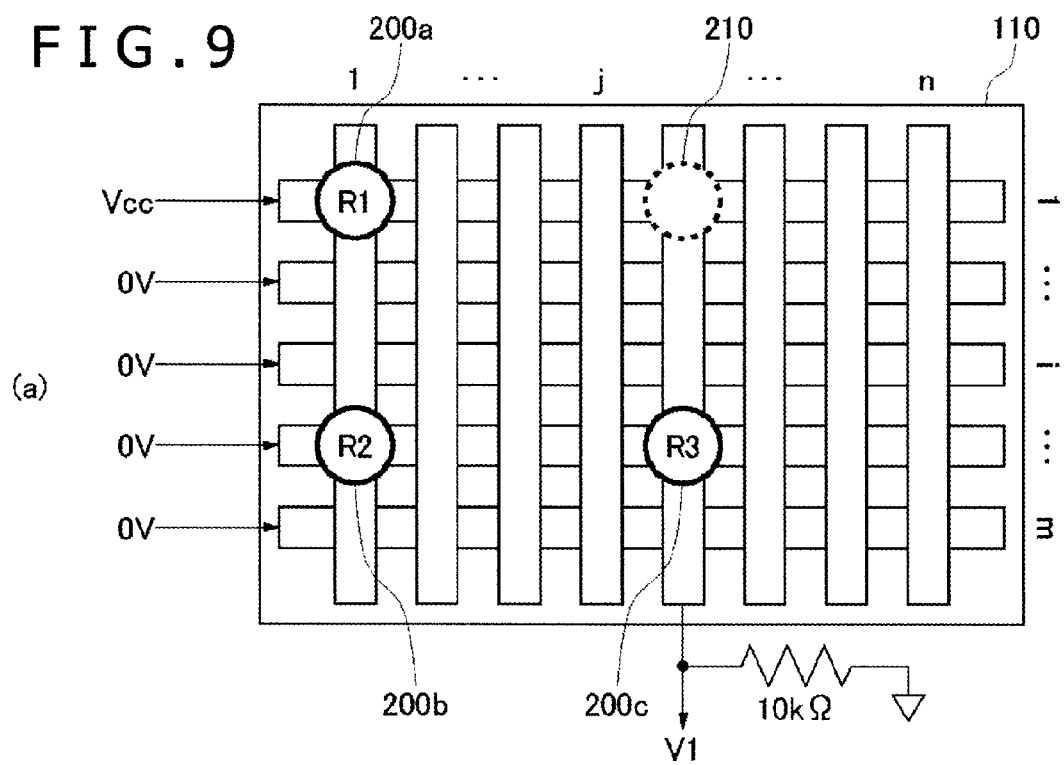
(a)
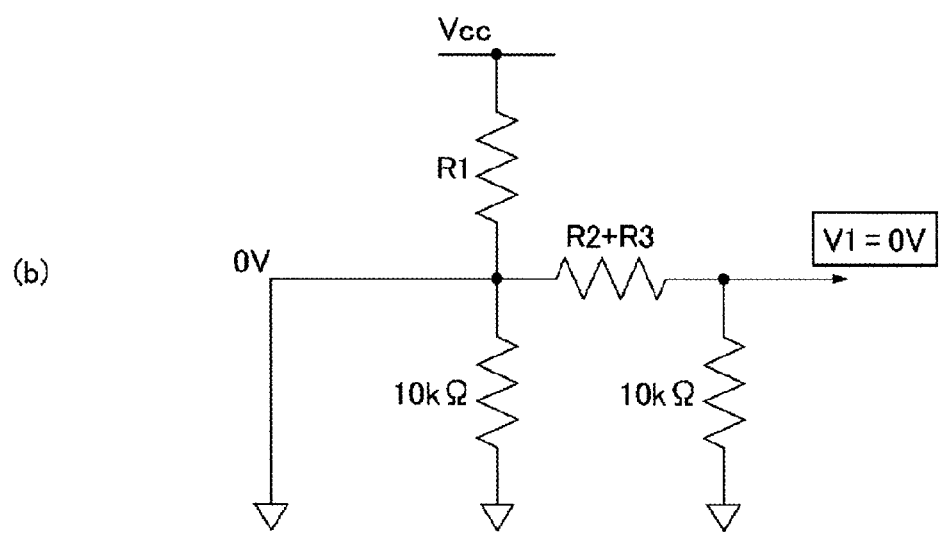
(b)

FIG. 10
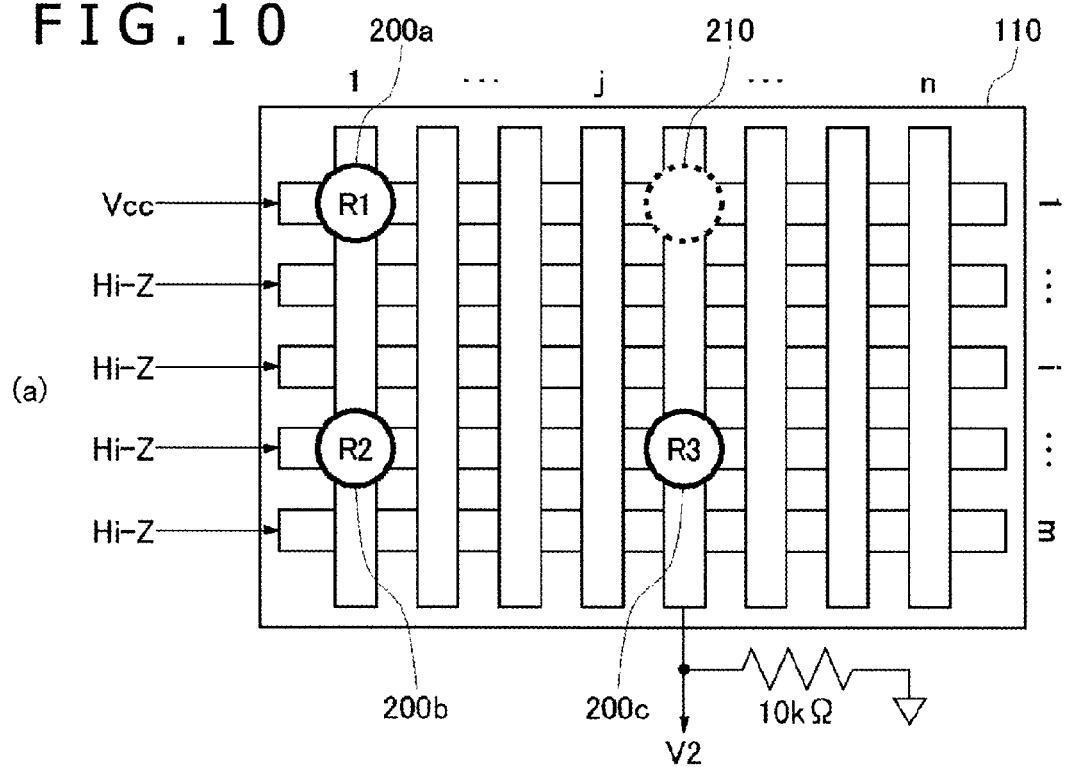
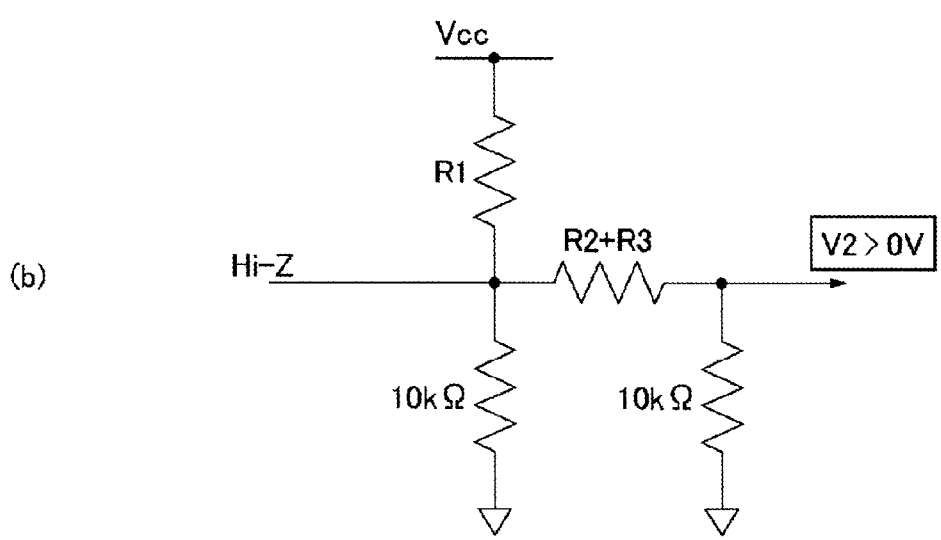

FIG. 14
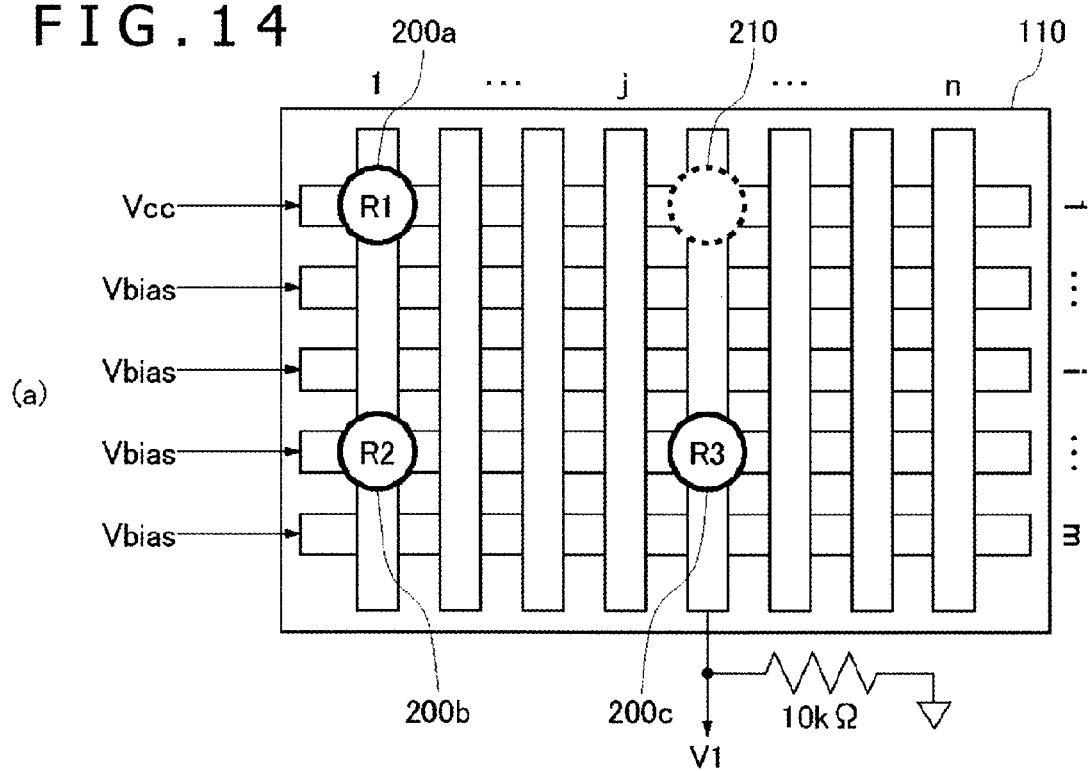
(a)
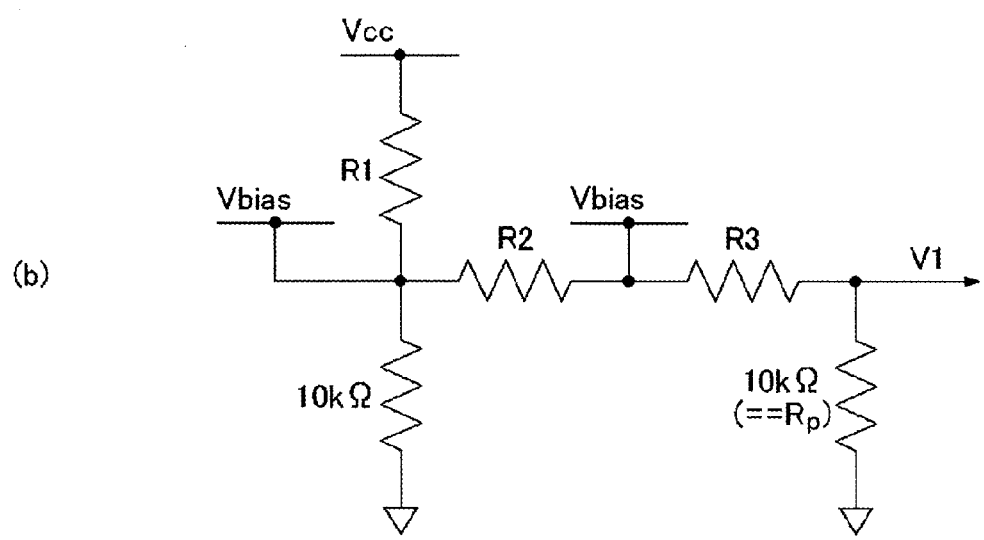
(b)

TOUCH INPUTTING DEVICE CONTROLLING APPARATUS AND TOUCH INPUTTING DEVICE CONTROLLING METHOD

TECHNICAL FIELD

The present invention relates to an apparatus for and a method of controlling a touch inputting device.

BACKGROUND ART

An interface apparatus such as a touch panel or a touch pad wherein a human being can touch directly with a display screen by a finger to carry out inputting is used widely in personal computers, various portable apparatus and portable telephones and so forth. Recently, also an apparatus has appeared which can acquire, in addition to coordinates of a touched point, attribute information relating to the touched point such as a strength (pressure) of the touch or a direction of a finger.

Patent Literature 1 discloses a portable image displaying apparatus which includes a display screen on both of the front and rear faces thereof.

CITATION LIST

Patent Literature

[PTL1] JP 2010-26064 A

SUMMARY

Technical Problem

In recent years, a multi-touch panel of the type called projective type (projection type) wherein detection points are disposed in an X-Y lattice pattern for performing time-division scanning in order to detect a multi-touch state is becoming a mainstream. When a multi-touch input of touching a plurality of locations of a touch panel or a touch pad of such a projection type as described above is carried out, it is difficult to detect the position and the pressure at a plurality of touched points with a high degree of accuracy. Further, a problem of a "ghost touch" that, when a plurality of locations are touched simultaneously, depending upon an electric state, a voltage is detected from a location which is not actually touched and, as a result, such a fixed pressure as may appear when a location which is not actually touched seems to be touched.

The present invention has been made in view of such a problem as described above, and it is an object of the present invention to provide a technology by which a multi-touch input can be detected with a high degree of accuracy.

Solution to Problem

In order to solve the problem described above, a touch inputting device controlling apparatus according to an aspect includes: a touch inputting device including a plurality of conductor lines disposed in each of a first direction and a second direction and a pressure-sensitive resistive element provided at a location at which two of the conductor lines cross with each other; a driving unit configured to successively select one drive line from among a plurality of drive lines provided as the conductor lines disposed in the first direction, and apply a driving voltage to the selected drive line; a voltage detection unit configured to successively select one sensing line from among a plurality of sensing lines provided as the conductor lines disposed in the second direction, and detect an output voltage of the selected sensing line; and an arithmetic operation unit configured to determine a resistance value of the pressure-sensitive resistive element provided at the location at which the selected drive line and the selected sensing line cross with each other based on the driving voltage and the output voltage. The driving unit applies 0 volts or a bias voltage equal to or lower than the driving voltage to the other drive lines than the selected drive line.

Also another aspect of the present invention is a touch inputting device controlling apparatus. The apparatus includes: a touch inputting device including a plurality of conductor lines disposed in each of a first direction and a second direction and a pressure-sensitive resistive element provided at a location at which two of the conductor lines cross with each other; a driving unit configured to successively select one drive line from among a plurality of drive lines provided as the conductor lines disposed in the first direction, and apply a driving voltage to the selected drive line; a voltage detection unit configured to successively select one sensing line from among a plurality of sensing lines provided as the conductor lines disposed in the second direction, and detect an output voltage of the selected sensing line; and an arithmetic operation unit configured to determine a resistance value of the pressure-sensitive resistive element provided at the location at which the selected drive line and the selected sensing line cross with each other based on the driving voltage and the output voltage. A scanning operation, which includes supply of the driving voltage to the drive line by the driving unit and detection of the output voltage from the sensing line by the voltage detection unit, is carried out at two stages such that the electric state to be applied to the other drive lines than the drive line selected by the driving unit differs between the scanning operation at the first stage and the scanning operation at the second stage. The arithmetic operation unit arithmetically operates a first output voltage detected by the voltage detection unit in the scanning operation at the first stage and a second output voltage detected by the voltage detection unit in the scanning operation at the second stage to determine a final output voltage, and determines a resistance value of the pressure-sensitive resistive element provided at the location at which the selected drive line and the selected sensing line cross with each other based on the driving voltage and the final output voltage.

A further aspect of the present invention is a touch inputting device controlling method. The method includes: a driving step of successively selecting, from within a touch inputting device including a plurality of conductor lines disposed in each of a first direction and a second direction and a pressure-sensitive resistive element provided at a location at which two of the conductor lines cross with each other, one drive line from among a plurality of drive lines provided as the conductor lines disposed in the first direction, and applying a driving voltage to the selected drive line; a voltage detection step of successively selecting one sensing line from among a plurality of sensing lines provided as the conductor lines disposed in the second direction, and detecting an output voltage of the selected sensing line; and an arithmetic operation step of determining a resistance value of the pressure-sensitive resistive element provided at the location at which the selected drive line and the selected sensing line cross with each other based on the driving voltage and the output voltage. The driving step applies 0 volts or a bias voltage equal to or lower than the driving voltage to the other drive lines than the selected drive line.

Also a still further aspect of the present invention is a touch inputting device controlling method. The method includes: a driving step of successively selecting, from within a touch inputting device including a plurality of conductor lines disposed in each of a first direction and a second direction and a pressure-sensitive resistive element provided at a location at which two of the conductor lines cross with each other, one drive line from among a plurality of drive lines provided as the conductor lines disposed in the first direction, and applying a driving voltage to the selected drive line; a voltage detection step of successively selecting one sensing line from among a plurality of sensing lines provided as the conductor lines disposed in the second direction, and detecting an output voltage of the selected sensing line; and an arithmetic operation step of determining a resistance value of the pressure-sensitive resistive element provided at the location at which the selected drive line and the selected sensing line cross with each other based on the driving voltage and the output voltage. A scanning operation, which includes supply of the driving voltage to the drive line by the driving step and detection of the output voltage from the sensing line by the voltage detection step, is carried out at two stages such that the electric state to be applied to the other drive lines than the drive line selected by the driving step differs between the scanning operation at the first stage and the scanning operation at the second stage. The arithmetic operation step arithmetically operates a first output voltage detected by the voltage detection step in the scanning operation at the first stage and a second output voltage detected by the voltage detection step in the scanning operation at the second stage to determine a final output voltage, and determines a resistance value of the pressure-sensitive resistive element provided at the location at which the selected drive line and the selected sensing line cross with each other based on the driving voltage and the final output voltage.

It is to be noted that also an arbitrary combination of the components described above and the representation of the present invention where it is converted between different ones of a method, an apparatus, a system, a computer program, a data structure, a recording medium and so forth are effective as modes of the present invention.

Advantageous Effect of Invention

With the present invention, a multi-touch input can be detected with a high degree of accuracy.

BRIEF DESCRIPTION OF DRAWINGS

FIG. 6A is a view illustrating a ghost touch which appears upon multi-touch inputting.
FIG. 6B is a view illustrating a ghost touch which appears upon multi-touch inputting.
FIG. 9 is a set of views illustrating a principle by which a ghost touch is canceled by a two-stage scanning method of the touch inputting device according to the present embodiment.
FIG. 10 is a set of views illustrating the principle by which a ghost touch is canceled by the two-stage scanning method of the touch inputting device according to the present embodiment.
FIG. 14 is a set of views illustrating a modification wherein a driving voltage is applied to a drive line which makes a scanning target and a bias voltage is applied to the other drive lines in the scanning at the first stage.

DESCRIPTION OF EMBODIMENTS

Figure 1:
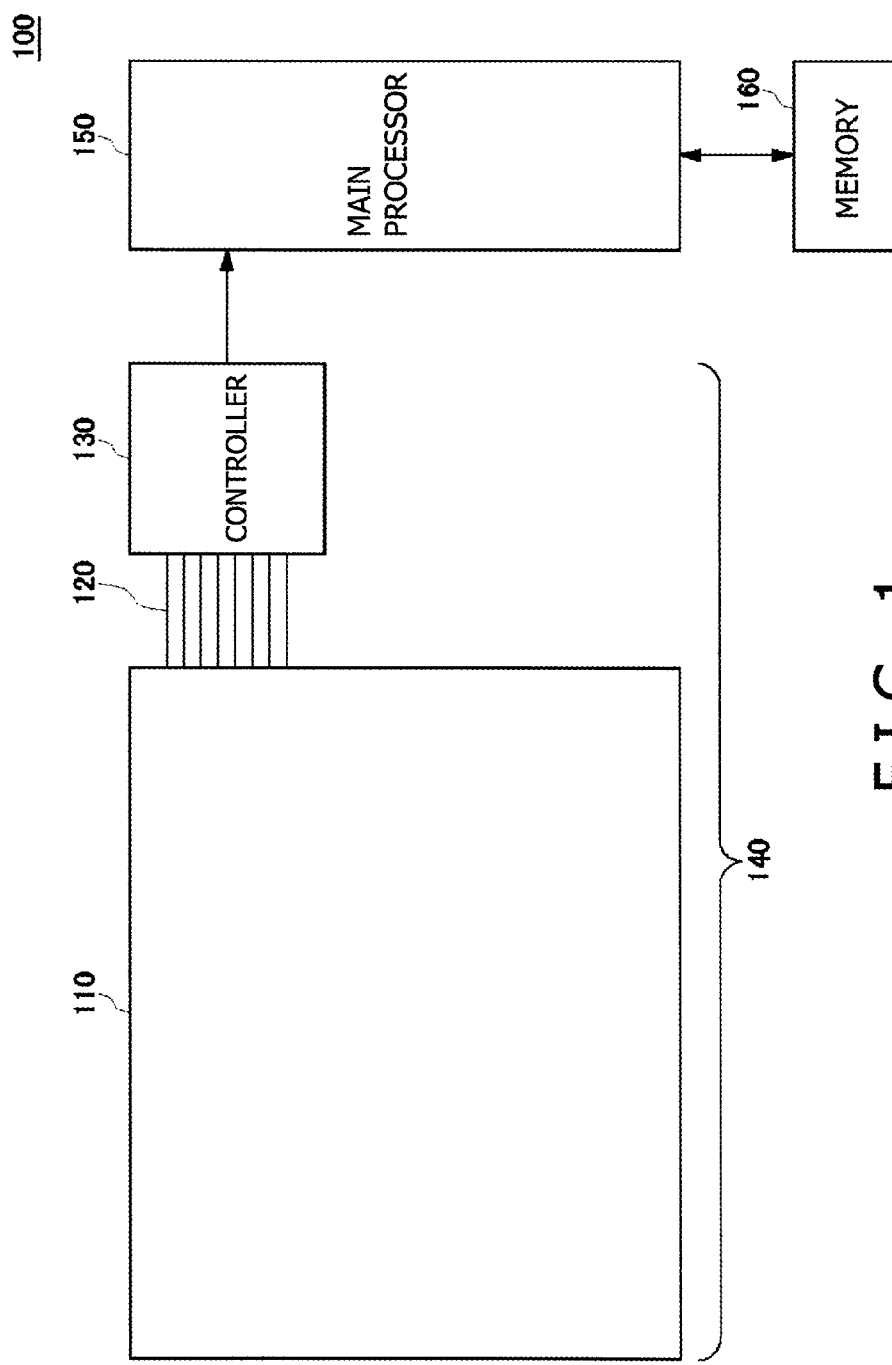
FIG. 1 is a block diagram of a touch input processing apparatus according to an embodiment.

FIG. 1 is a block diagram of a touch input processing apparatus 100 according to an embodiment. Some or all of functional components of the touch input processing apparatus 100 depicted in FIG. 1 can be implemented, as an example, by hardware, software or a combination of hardware and software in a personal computer, a game machine, a portable apparatus, a portable terminal or the like.

The touch input processing apparatus 100 includes a touch inputting device unit 140, a main processor 150, and a memory 160. The touch inputting device unit 140 includes a touch inputting device 110, and a touch inputting device controller 130 connected to the touch inputting device 110 by a flexible board 120.

The touch inputting device 110 is an inputting device for detecting a contact point (position) by a finger or the like (the position is hereinafter referred to as "touch point (position)") and a detection amount (hereinafter referred to as "touch state amount") such as a capacitance or a resistance indicative of a contact state at the touch point (position).

An example of the touch inputting device 110 is a touch panel. The touch panel is a transparent panel device and is disposed in an overlapping relationship on a display apparatus such as a liquid crystal display unit or an organic EL (electroluminescence) display unit. Consequently, the user can input an operation for the screen by directly touching with the touch panel while observing the screen of the display unit. Another example of the touch inputting device 110 is a touch pad. The touch pad is an opaque touch inputting device, and a display unit is not provided for the touch pad.

As a detection method for a touch point and a touch state amount for the touch inputting device 110, a capacitance method and a pressure sensing method are available. In the case of the capacitance method, the touch inputting device controller 130 measures the variation amount of the capacitance at individual points of the touch inputting device 110 to detect the position of a touch point and the capacitance value at the touch point. In the case of the pressure sensing method, the touch inputting device controller 130 measures the variation amount of the pressure at individual points of the touch inputting device 110 to detect the position of a touch point and the pressure value at the touch point. In the present embodiment, a working example which assumes the touch inputting device 110 of the pressure sensing method is described.

As an example of the pressure-sensitive type touch panel, a touch pad wherein a special pressure-sensitive material is printed on a PET film is available. The touch pad of the type just described can achieve pressure measurement over a wide dynamic range from a touch of a very low pressure like a pressure when the touch pad is touched by a feather like a feather touch to a touch of a very high pressure when the touch pad is touched with a force put on the fingertip.

The main processor 150 acquires time series data of the position and the state amount of the touch point detected by the touch inputting device controller 130 and reads and writes data into and from the memory 160.

Figure 2:
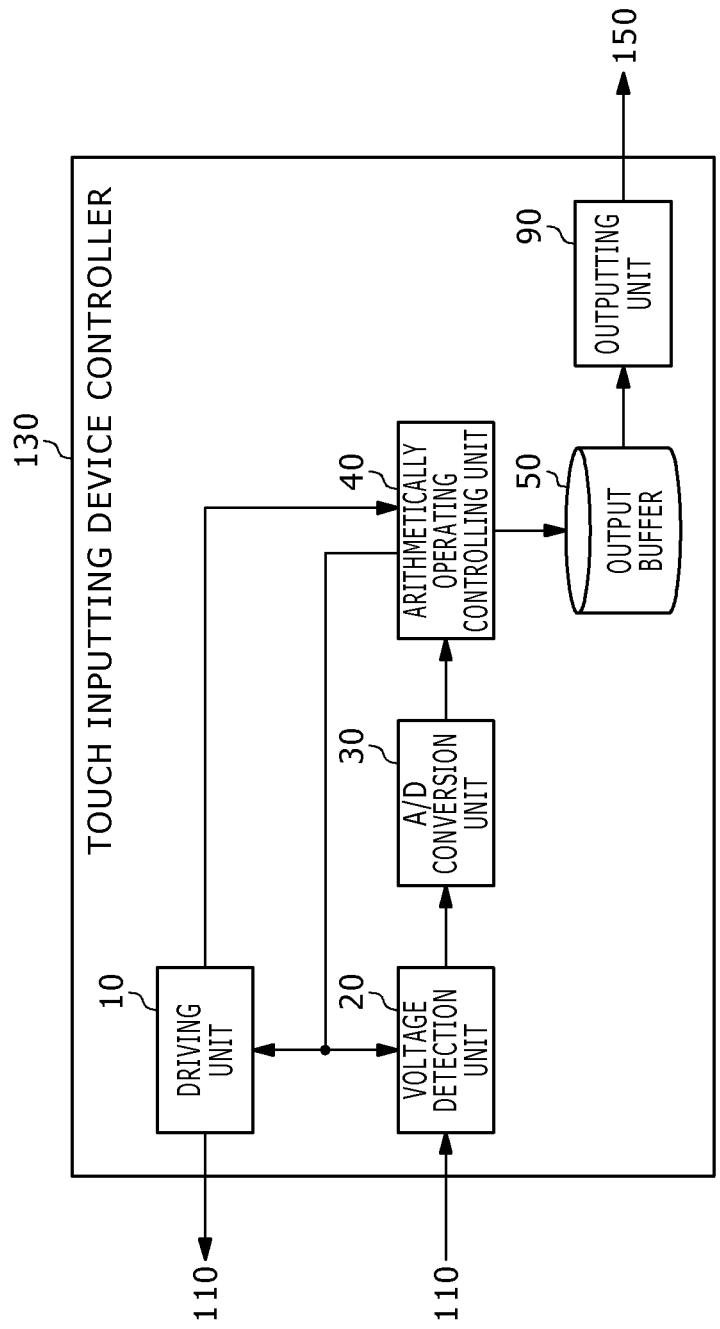
FIG. 2 is a functional block diagram of a touch inputting device controller of FIG. 1.

FIG. 2 is a functional block diagram of the touch inputting device controller 130. The touch inputting device controller 130 includes a driving unit 10, a voltage detection unit 20, an A/D conversion unit 30, an arithmetically operating controlling unit 40, an output buffer 50 and an outputting unit 90.

The driving unit 10 supplies a driving voltage to a drive line of the touch inputting device 110, and the voltage detection unit 20 detects an output voltage from a sensing line of the touch inputting device 110. The A/D conversion unit 30 A/D converts the detected output voltage.

The arithmetically operating controlling unit 40 determines, from the driving voltage and the output voltage, a resistance value of a pressure-sensitive resistive element provided at a location at which a drive line and a sensing line cross with each other. The arithmetically operating controlling unit 40 further determines a pressure applied to the pressure-sensitive resistive element from a characteristic of the pressure-sensitive resistive element, and retains the determined resistance value and pressure into the output buffer 50. Further, the arithmetically operating controlling unit 40 controls the timing at which the driving unit 10 is to drive a drive line and the timing at which the voltage detection unit 20 is to scan a sensing line. The outputting unit 90 reads out data indicative of the pressure at each of crossing points between the drive lines and the sensing lines from the output buffer 50 and transmits the data to the main processor 150.

Figure 3:
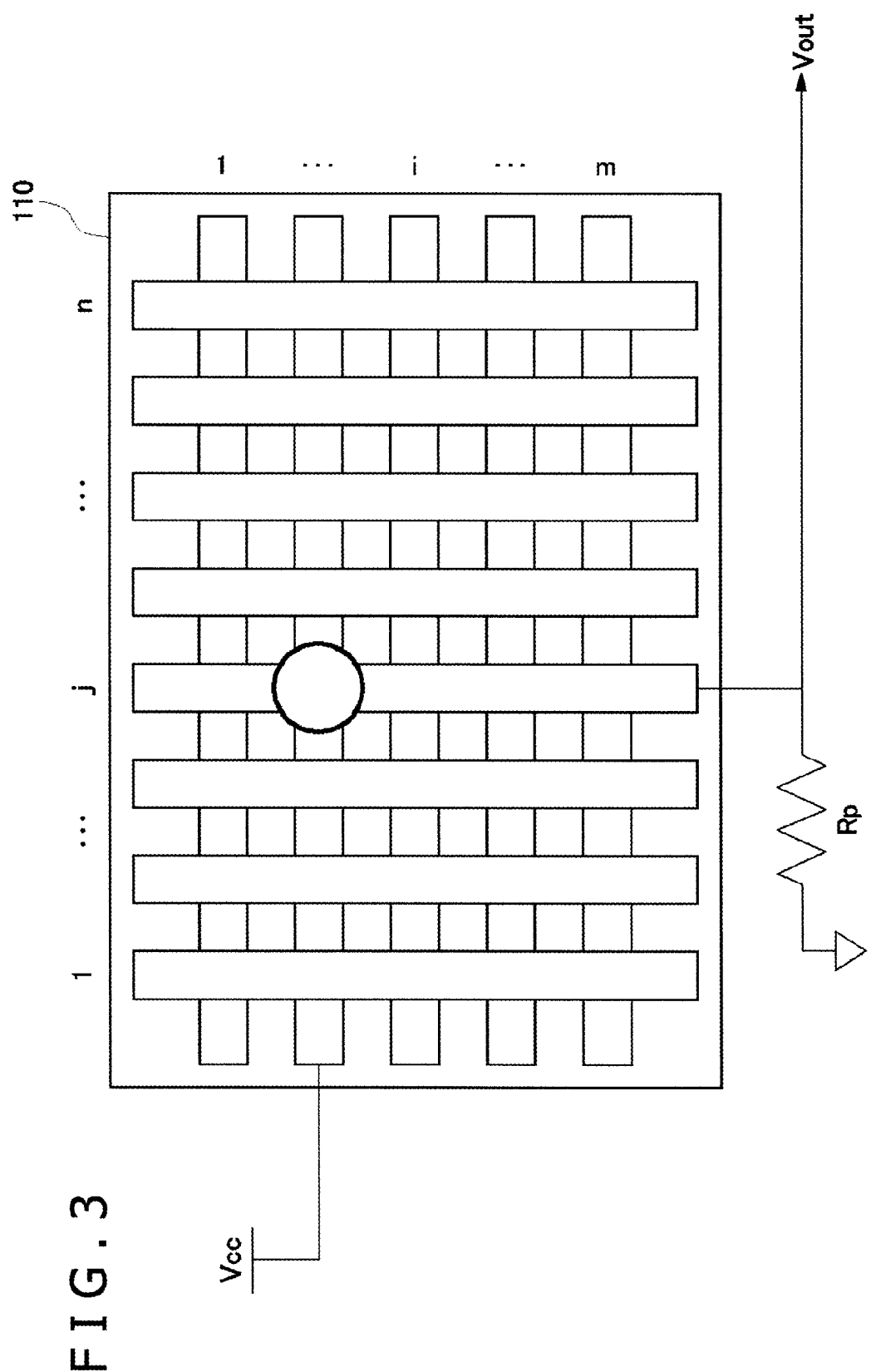
FIG. 3 is a view illustrating an internal structure of the touch inputting device of FIG. 1.

FIG. 3 is a view depicting an internal structure of the touch inputting device 110. As depicted in FIG. 3, in a multi-touch panel of the projection type, conductor lines of a strip shape are disposed in a horizontal direction and a vertical direction, and a pressure-sensitive resistive element is applied to each of the crossing points of the conductor lines. The conductor lines are formed from a material such as silver, copper or carbon. The pressure-sensitive resistive element is made of a material having a resistance value which varies by a great amount in response to a pressure applied thereto.

m conductor lines (horizontal lines) disposed in the horizontal direction of the touch inputting device 110 are the drive lines for applying a voltage, and n conductor lines (vertical lines) disposed in the vertical direction are the sensing lines for reading a voltage value.

The driving unit 10 applies a driving voltage Vcc to the ith one of the m drive lines, and the voltage detection unit 20 detects an output voltage Vout from the jth one of the n sensing lines. The A/D conversion unit 30 A/D converts the detected output voltage Vout. The arithmetically operating controlling unit 40 determines the resistance value R of the pressure-sensitive resistive element at the crossing point (i, j) of the ith drive line and the jth sensing line from the driving voltage Vcc and the output voltage Vout.

The resistance value R of the pressure-sensitive resistive element at the crossing point (i, j) at which the pressure is to be sensed is a function of the pressure f applied to the pressure-sensitive resistive element. Therefore, if this is represented as R(f), then the output voltage Vout can be represented by the following expression using the driving voltage Vcc and the resistance value R(f) of the pressure-sensitive resistive element at the crossing point:

$$Vout = Vcc \times Rp/(R(f)+Rp) \quad (1)$$

Here, Rp is a pull-down resistor Rp connected to each sensing line. This achieves an action of stabilizing the voltage value of the sensing line when the crossing point is not touched at 0 volts. The value of the pull-down resistor Rp is set in accordance with a variation range of the resistance value of the pressure-sensitive resistive element. The pull-down resistor Rp has a resistance set to a rather high value than a maximum value of R(f) to be detected. For example, the value of the pull-down resistor Rp is generally set to a value, for example, from 1 k$\Omega$ to 100 k$\Omega$.

When the crossing point is not touched, since R(f)$\rightarrow\infty$, Vout$\rightarrow$0. If the crossing point is touched lightly, then R(f)$\rightarrow$0, and therefore, Vout$\rightarrow$Vcc.

If the equation given above is solved for R(f), then the following expression (2) is obtained.

$$R(f) = R_p \times (Vcc - Vout)/Vout \quad (2)$$

Consequently, if the output voltage Vout is detected under the driving voltage Vcc, then the resistance value R(f) of the pressure-sensitive resistive element at the cross point can be determined.

If the drive line and the sensing line are successively changed over to carry out measurement of the output voltage Vout, then the resistance value R(f) of the pressure-sensitive resistive element at all crossing points can be obtained. Where the number of drive lines is m and the number of sensing lines is n, detection and A/D conversion of an output voltage are carried out by m×n times.

Figure 4:
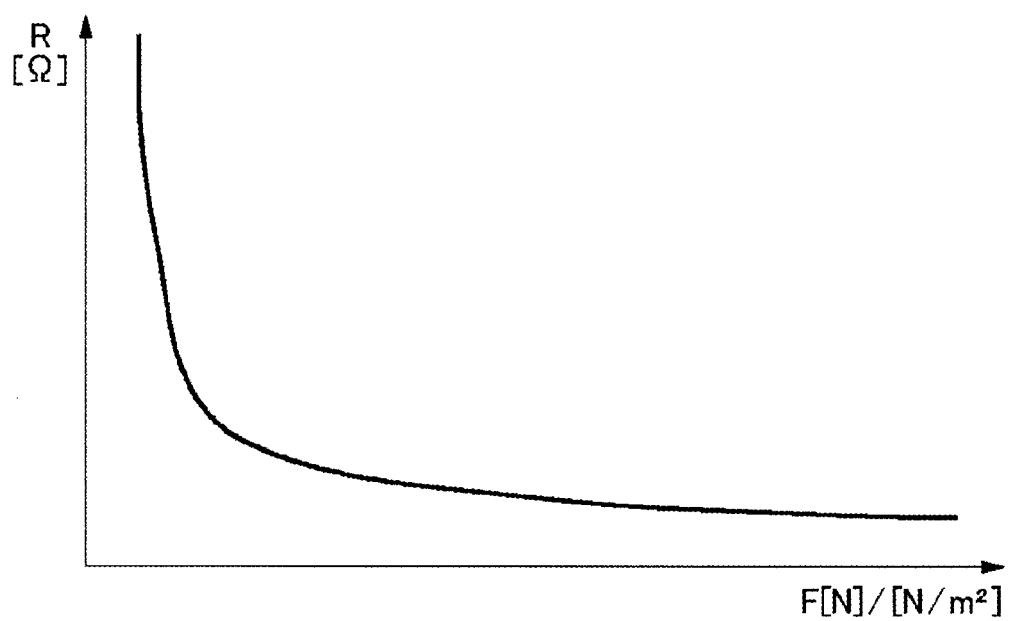
FIG. 4 is a graph illustrating a relationship between the pressure applied to a pressure-sensitive resistive element and a resistance value of the voltage-sensitive resistive element.

FIG. 4 is a graph illustrating a relationship between the pressure f applied to a voltage sensing resistance member and the resistance value R of the pressure sensing member. The unit of the pressure f is N/m$^2$, and the unit of the resistance value R is $\Omega$. Force whose unit is N may be used in place of the pressure. An f-R curve generally is such a monotonically decreasing curve as depicted in FIG. 4, and as the pressure increases, the resistance value decreases. The order number and the shape of the curve differ depending upon the material of the pressure-sensitive resistive element. A table representing a graph of the f-R characteristic of the pressure-sensitive resistive element is retained in the output buffer 50.

The arithmetically operating controlling unit 40 determines the pressure f corresponding to the resistance value R of a pressure-sensitive resistive element based on the graph or the table representative of the f-R characteristic of the pressure-sensitive resistive element and stores the pressure f at the sensed crossing point into the output buffer 50. If the pressure f is 0 or equal to or higher than a predetermined threshold value, then it can be regarded that the crossing point is touched. The outputting unit 90 reads out data representative of the pressure at each crossing point from the output buffer 50 and outputs the data.

Figure 5:
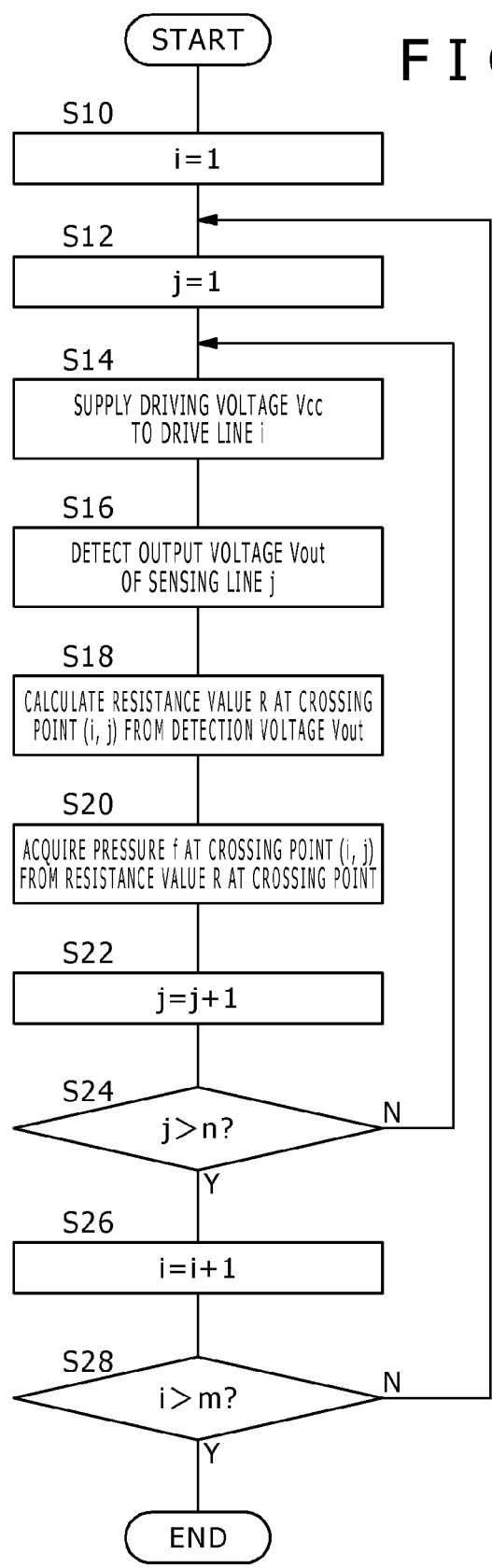
FIG. 5 is a flow chart illustrating a sensing procedure of a pressure-sensitive multi-touch panel.

FIG. 5 is a flow chart illustrating a sensing procedure of a pressure-sensitive multi-touch panel.

A variable i for designating a drive line is initialized to 1 (S10). Another variable j for designating a sensing line is initialized to 1 (S12).

The driving unit 10 supplies a driving voltage Vcc to the drive line i of the touch inputting device 110 (S14). The voltage detection unit 20 detects the output voltage Vout of the sensing line j of the touch inputting device 110, and the A/D conversion unit 30 A/D converts the detected output voltage Vout (S16). The arithmetically operating controlling unit 40 calculates the resistance value R of the pressure-sensitive resistive element at the crossing point (i, j) from the driving voltage Vcc and the output voltage Vout in accordance with the expression (2) given hereinabove (S18). The arithmetically operating controlling unit 40 determines the pressure f applied to the crossing point (i, j) from the resistance value R of the pressure-sensitive resistive element based on the f-R curve (S20).

The variable j for designating a sensing line is incremented by 1 (S22), and if the variable j is equal to or lower than n (N at S24), then the processing returns to step S14 and then steps S14 to S22 are repeated. If the variable j is higher than n (Y at S24), then the variable i for designating a drive line is incremented by 1 (S26). If the variable i is equal to or lower than m (N at S28), then the processing returns to step S12 and then steps S12 to S26 are repeated. If the variable i is higher than m (Y at S28), then the processing is ended.

A multi-touch input can be detected by such a sensing procedure as described above. However, particularly in the case of a touch panel/touch pad of the pressure sensitive type, upon detection of a multi-touch input, a problem of "ghost-touch" that a pressure f is detected from a crossing point which is not touched actually sometimes occurs.

FIGS. 6A and 6B are views illustrating a ghost touch which occurs upon multi-touch inputting.

It is assumed that, on the touch inputting device 110, a crossing point (1, 1) (reference character 200a), another crossing point (4, 1) (reference character 200b) and a further crossing point (4, 5) (reference character 200c) are actually touched as depicted in FIG. 6A. It is assumed that, while the three points are touched at the same time, the driving voltage Vcc is supplied to the drive line 1 and the output voltage Vout of the sensing line 5 is detected. Since the crossing (1, 5) is not touched in principle, the resistance value R of the pressure-sensitive resistive element at the crossing point (1, 5) is infinite and it is considered that the output voltage Vout is 0.

However, since the three touch points are pressed, if the output voltage Vout is detected from the sensing line 5 in a state in which the driving voltage Vcc is supplied to the drive line 1, then current flows as indicated by solid lines depicted in FIG. 6B. In particular, current enters from the drive line 1, passes through the pressure-sensitive resistive element at the crossing point (1, 1), enters the sensing line 1 and passes through the pressure-sensitive resistive element at the crossing point (4, 1), further enters the drive line 4 and passes through the pressure-sensitive resistive element at the crossing point (4, 5) and is finally outputted through the sensing line 5. Consequently, although the crossing point (1, 5) (reference numeral 210) is not actually touched, when the driving voltage Vcc is supplied to the drive line 1, an output voltage Vout which is not equal to 0 is detected from the sensing line 5. As a result, it is regarded that a pressure f which is not equal to 0 is applied to the pressure-sensitive resistive element at the crossing point (1, 5). This is the problem of "ghost touch."

Figure 7:
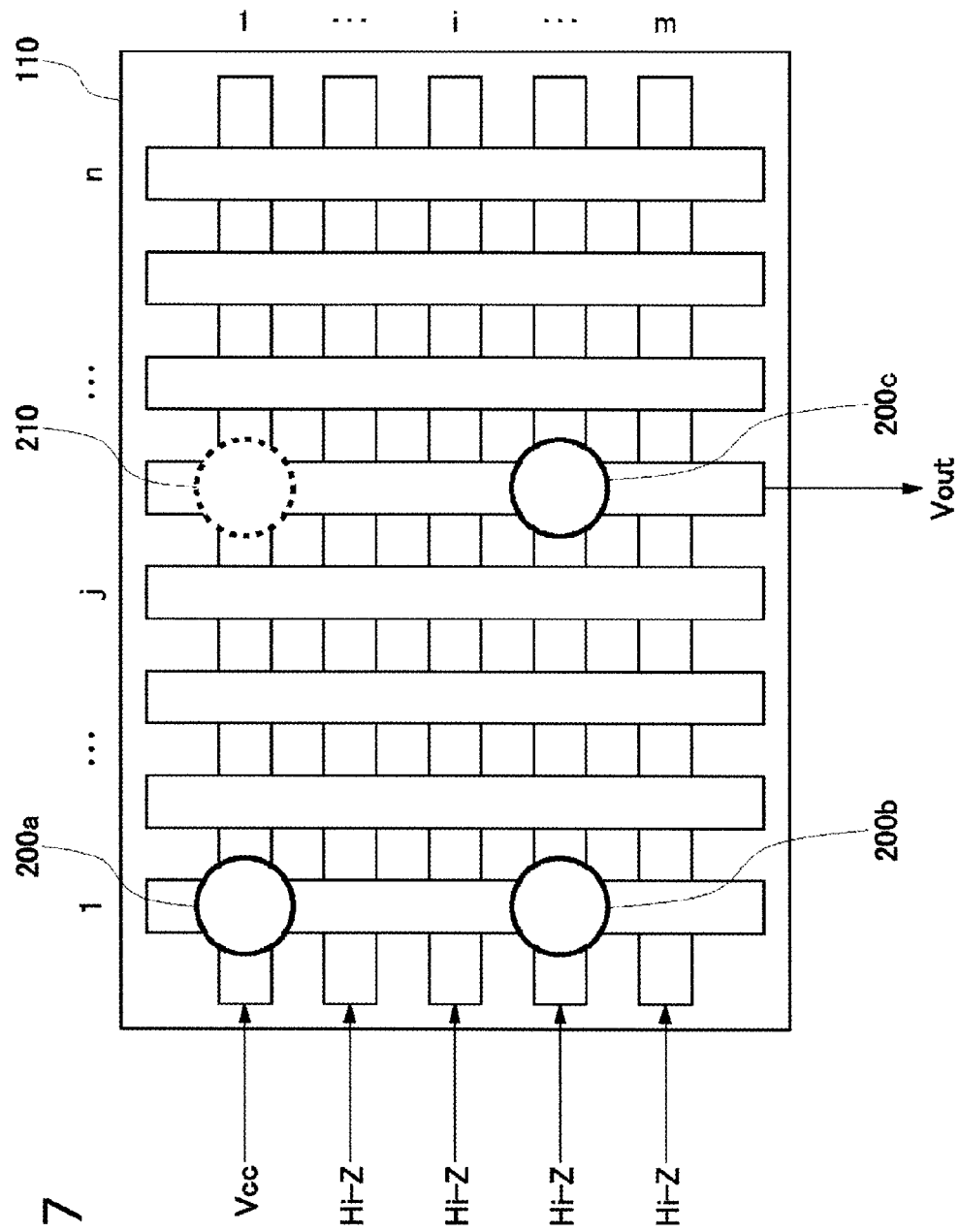
FIG. 7 is a view illustrating a scanning method of a conventional pressure-sensitive multi-touch panel.

FIG. 7 is a view illustrating a scanning method of a conventional pressure-sensitive multi-touch panel. Conventionally, when crossing points of conductor lines are scanned, the driving voltage Vcc is applied only to a drive line which is a scanning target while the other drive lines are placed in a high impedance (Hi-Z) state. Consequently, the lines other than the line from which a signal is to be detected can be electrically isolated, and sensitivity and the dynamic range of the pressure sensing can be increased. However, since the drive lines other than the drive line which is a scanning target can take any potential, such current as described hereinabove with reference to FIG. 6B flows. Therefore, it cannot be avoided that a ghost touch occurs at a crossing point (reference numeral 210) between the drive line which is a scanning target and the sensing line.

Figure 8A:
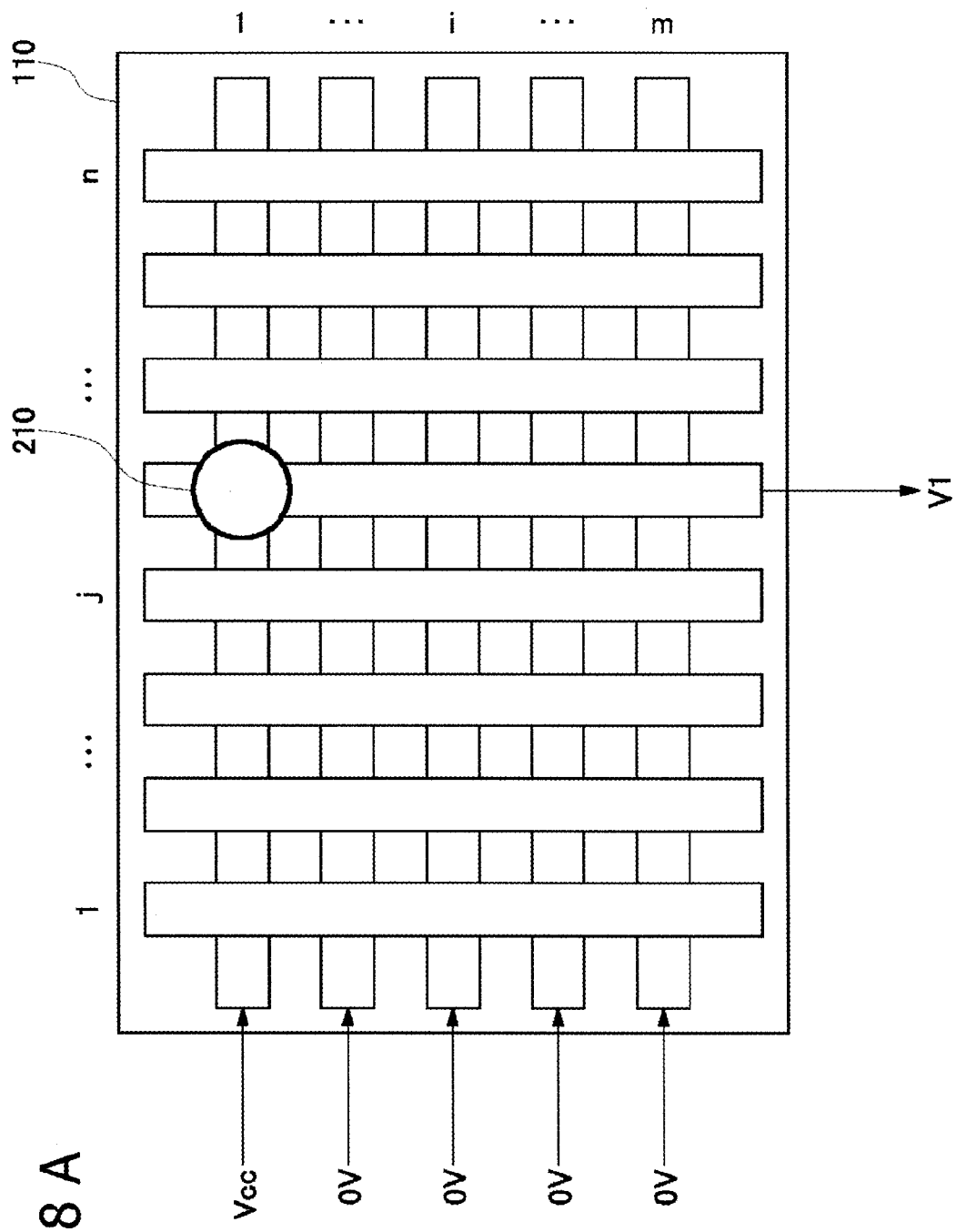
FIG. 8A is a view illustrating scanning at a first stage of the touch inputting device according to the present embodiment.
Figure 8B:
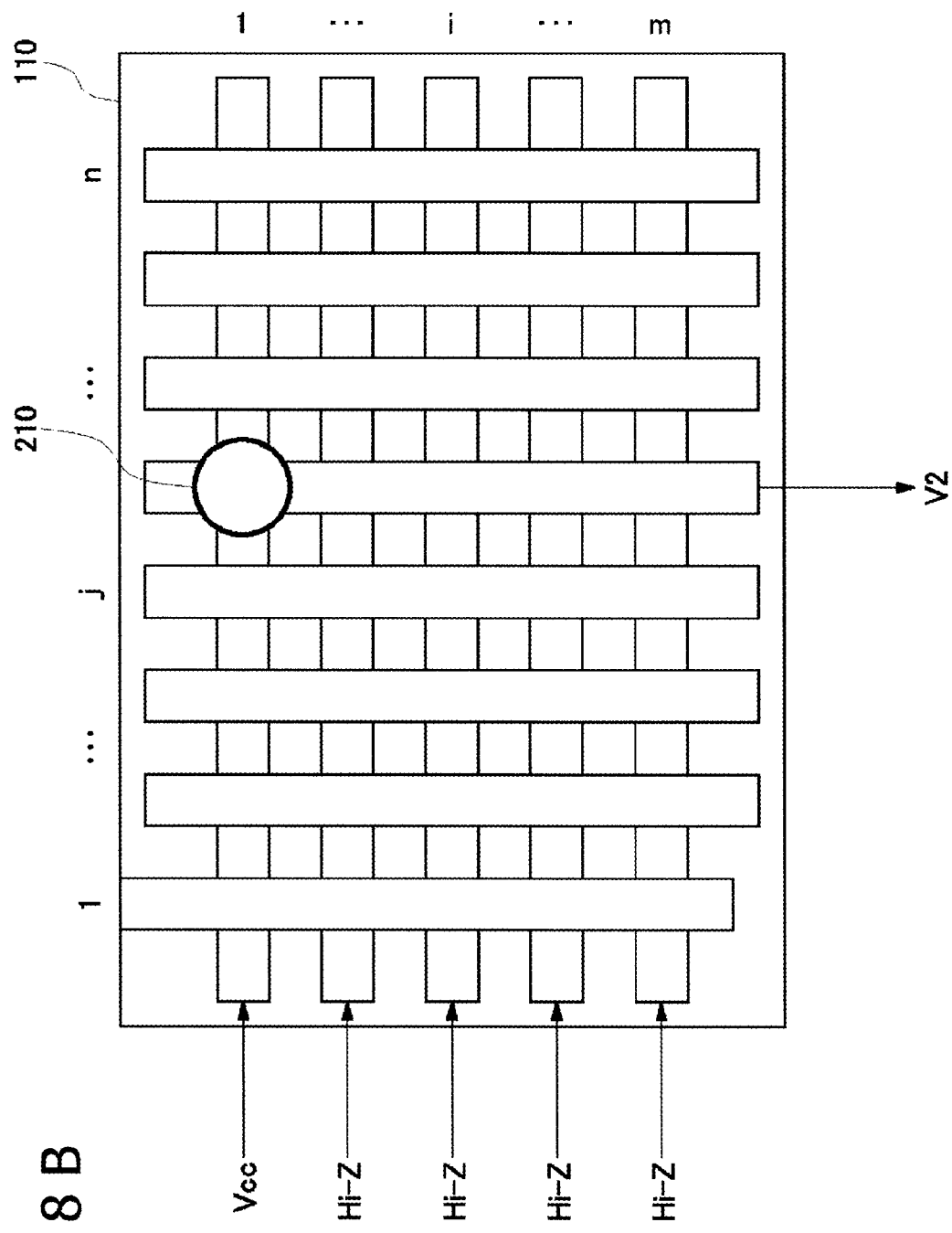
FIG. 8B is a view illustrating scanning at a second stage of the touch inputting device according to the present embodiment.

Therefore, in the present embodiment, a two-stage scanning method described with reference to FIGS. 8A and 8B is adopted. FIG. 8A illustrates scanning at the first stage, and FIG. 8B illustrates scanning at the second stage.

At the first stage, when scanning of the crossing point (1, 5) is carried out, the driving unit 10 applies the driving voltage Vcc to the drive line 1 and drives the other drive lines 2 to 5 to 0 volts while the voltage detection unit 20 detects the output voltage V1 from the sensing line 5 as depicted in FIG. 8A, and the A/D conversion unit 30 A/D converts the detected output voltage V1. While scanning of the crossing point (1, 5) is described here, also with regard to the other crossing points, the driving voltage Vcc is applied to a drive line of a scanning target while the other drive lines are driven to 0 volts and the output voltage V1 is detected from the sensing line similarly.

At the second stage, when scanning of the crossing point (1, 5) is to be performed, the driving unit 10 applies the driving voltage Vcc to the drive line 1 and places the other drive lines 2 to 5 into a high impedance state while the voltage detection unit 20 detects the output voltage V2 from the sensing line 5 as depicted in FIG. 8B, and the A/D conversion unit 30 A/D converts the detected output voltage V2. The scanning method at the second stage is same as the conventional scanning method of FIG. 7.

The arithmetically operating controlling unit 40 multiplies the output voltage V1 detected at the first stage and the output voltage V2 detected at the second stage and divides the product by the dynamic range of the A/D conversion to determine a final output voltage Vout.

$$Vout=V2\times V1/(ADC\text{ dynamic range})$$

Further, the arithmetically operating controlling unit 40 determines the resistance value R at the crossing point from the driving voltage Vcc and the output voltage Vout in accordance with the expression (2) and determines the pressure f at the crossing point from the f-R graph.

It is described with reference to FIGS. 9 and 10 that a ghost touch is canceled by the two-stage scanning technique depicted in FIGS. 8A and 8B.

First, a case is considered wherein three points of a crossing point (1, 1) (reference character 200a), another crossing point (4, 1) (reference character 200b) and a further crossing point (4, 5) (reference character 200c) are actually touched while a further crossing point (1, 5) is not actually touched. The resistance values of the pressure-sensitive resistive elements at the crossing points (1, 1), (4, 1) and (4, 5) are represented by R1, R2 and R3, respectively.

FIG. 9(a) is a view illustrating the output voltage V1 detected by the scanning at the first stage, and FIG. 9(b) depicts an equivalent circuit to FIG. 9(a). As depicted in FIG. 9(a), the driving voltage Vcc is applied to the drive line 1 and the drive line 4 is driven to 0 V, and a resistor of 10 kΩ is connected as a pull-down resistor Rp to the sensing line 5. At this time, since the drive line is driven to 0 V as depicted in FIG. 9(b), when the crossing point (1, 5) is not actually touched, the output voltage V1 is 0 volts without fail.

If the driving voltage Vcc is applied to the drive line 1 which is a scanning target and 0 volts is applied to the other drive lines 2 to 5 in this manner, then no ghost touch is detected in principle. Even if only scanning at the first stage is carried out, cancellation of a ghost catch is carried out basically. However, by an actual touch by a finger, the finger touches not only with the pressure-sensitive resistive element at the touch position but also with conductors around the touch position depending on the thickness of the finger. Since the surrounding drive lines are driven to 0 volts, a voltage drop occurs. Therefore, if the crossing point (1, 5) is actually touched not by a ghost touch, then the value of the output voltage V1 is pulled to 0 volts at the surrounding drive lines, resulting in degradation of the resolution of the pressure value. Therefore, it is more preferable to combine scanning at the second stage to raise the detection sensitivity.

FIG. 10(a) is a view illustrating the output voltage V2 detected by scanning at the second stage, and FIG. 10(b) is an equivalent circuit to FIG. 10(a). As depicted in FIG. 10(a), the driving voltage Vcc is applied to the drive line 1 and the drive line 4 is placed in a high impedance state, and a resistor of 10 kΩ is connected as a pull-down resistor Rp to the sensing line 5. At this time, since the drive line 4 is in a high impedance state, when the crossing point (1, 5) is not actually touched, the output voltage V2 exhibits a positive value (is not equal to zero) as depicted in FIG. 10(b). In other words, since the scanning at the second stage is same as the conventional scanning, a ghost touch is detected.

When the crossing point (1, 5) is not actually touched, if the output voltage V1 detected at the first stage and the output voltage V2 detected at the second stage are multiplied and then divided by the dynamic range of the A/D conversion to determine a final output voltage Vout, then since V1=0 and V2>0, Vout=V2×V1/(ADC dynamic range)=0. In other words, since V1=0, the ghost touch is canceled and is not detected.

Now, a case in which the crossing point (1, 5) is actually touched is studied. In this case, in the scanning at the first stage, where the resistance value of the pressure-sensitive resistive element at the crossing point (1, 5) is represented by R0, since the crossing point (1, 5) is actually touched, the output voltage V1=Vcc×Rp/(R0+Rp) is detected in accordance with the expression (1) given hereinabove. In other words, V1≠0. Also in the scanning at the second stage, the output voltage V2=Vcc×Rp/(R0+Rp) is detected similarly. However, the output voltage V1 is detected lower than the output voltage V2 (V1<V2) by such a voltage drop as described hereinabove. Consequently, when the crossing point (1, 5) is not actually touched, if the final output voltage Vout is determined, then Vout=V2×V1/(ADC dynamic range)≠0. In other words, since V1≠0, when the crossing point (1, 5) is actually touched, the output voltage Vout is obtained with a high sensitivity.

As described above, by multiplying the output voltage V1 detected in the scanning at the first stage and the output voltage V2 detected in the scanning at the second stage to determine the final output voltage Vout, in the case of a ghost touch, the output voltage Vout is 0 and the ghost touch is canceled. However, in the case of an actual touch, the output voltage Vout is detected with a high sensitivity.

With the sensing method of the present embodiment, two times of scanning are required. However, if the microcomputer and the built-in A/D converter have a sufficiently high performance, then there is no problem in actual use. Further, although it is necessary to control the drive lines to three electric states of Vcc, 0 V and Hi-Z, since an I/O port of a general microcomputer can be controlled to three stages by software, also in installation, no additional hardware component is required.

Figure 11:
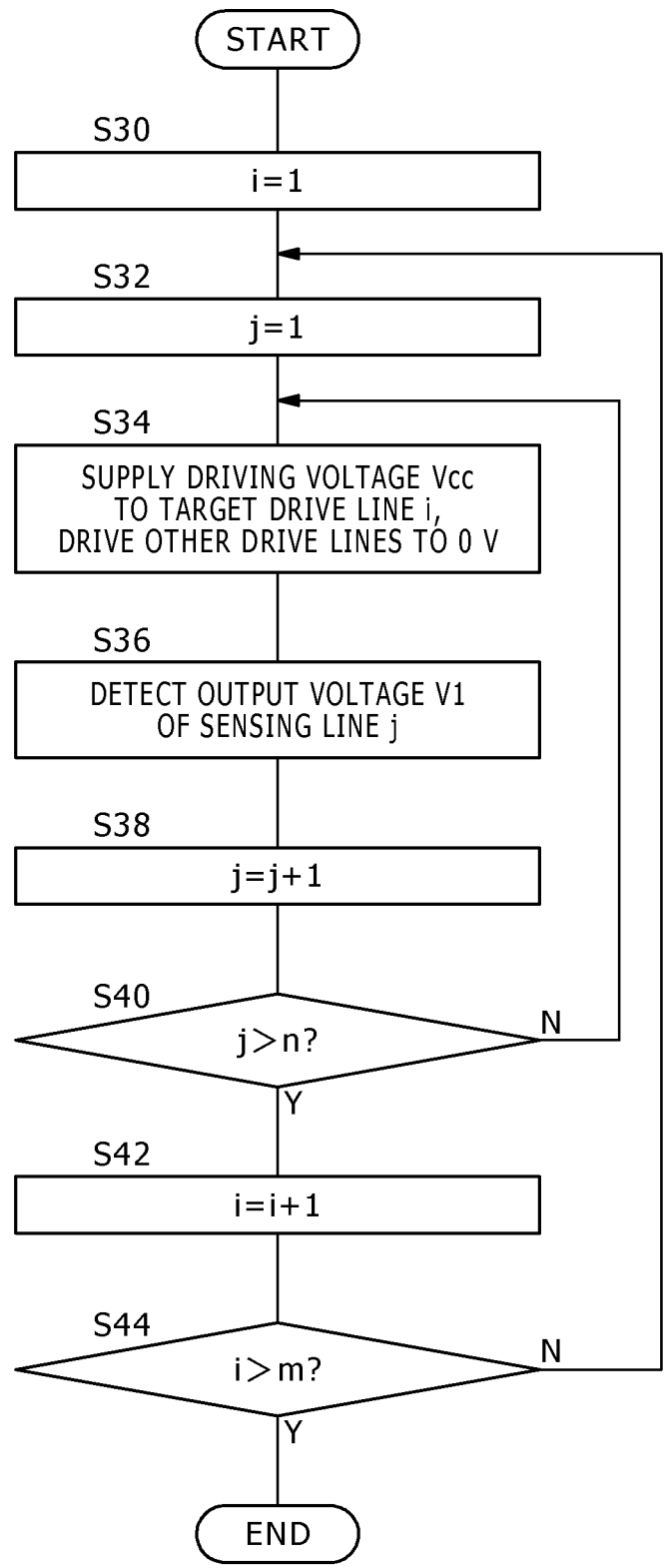
FIG. 11 is a flow chart illustrating a scanning procedure at the first stage.
Figure 12:
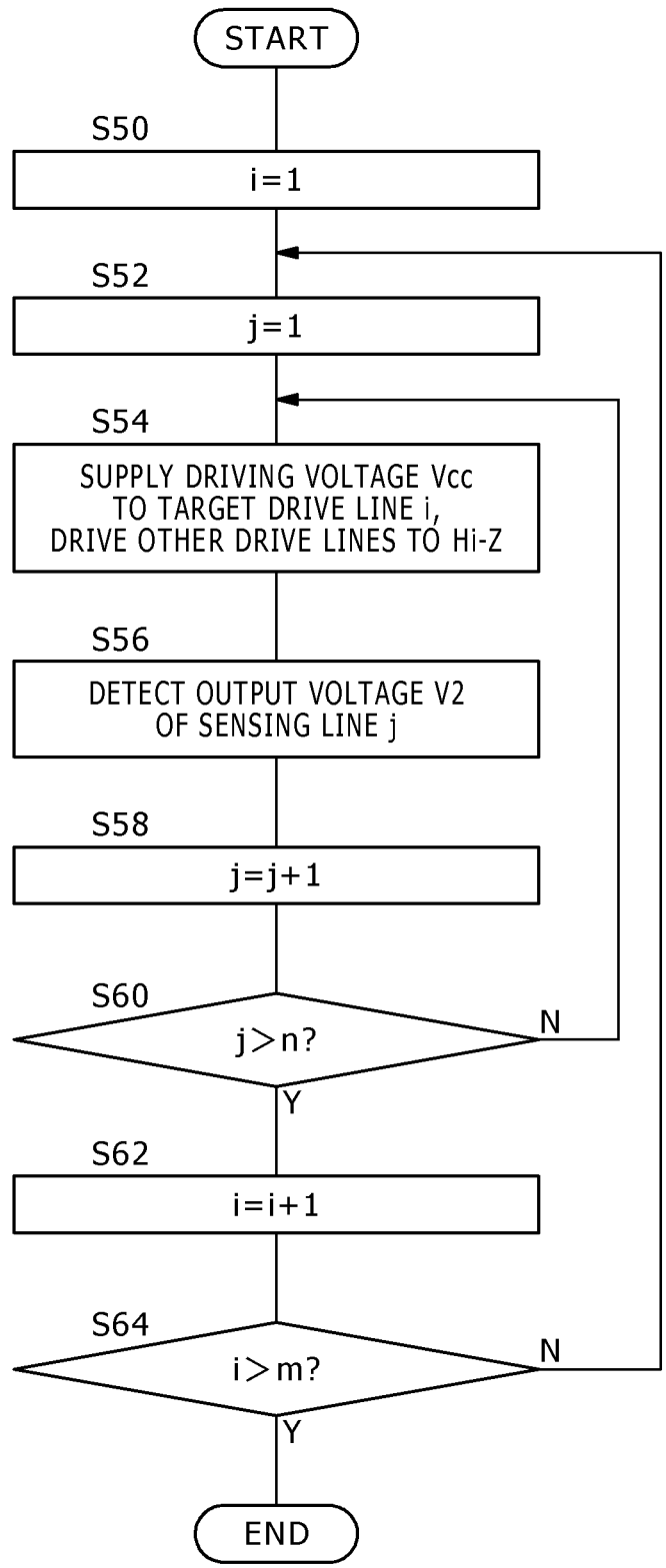
FIG. 12 is a flow chart illustrating a scanning procedure at the second stage.
Figure 13:
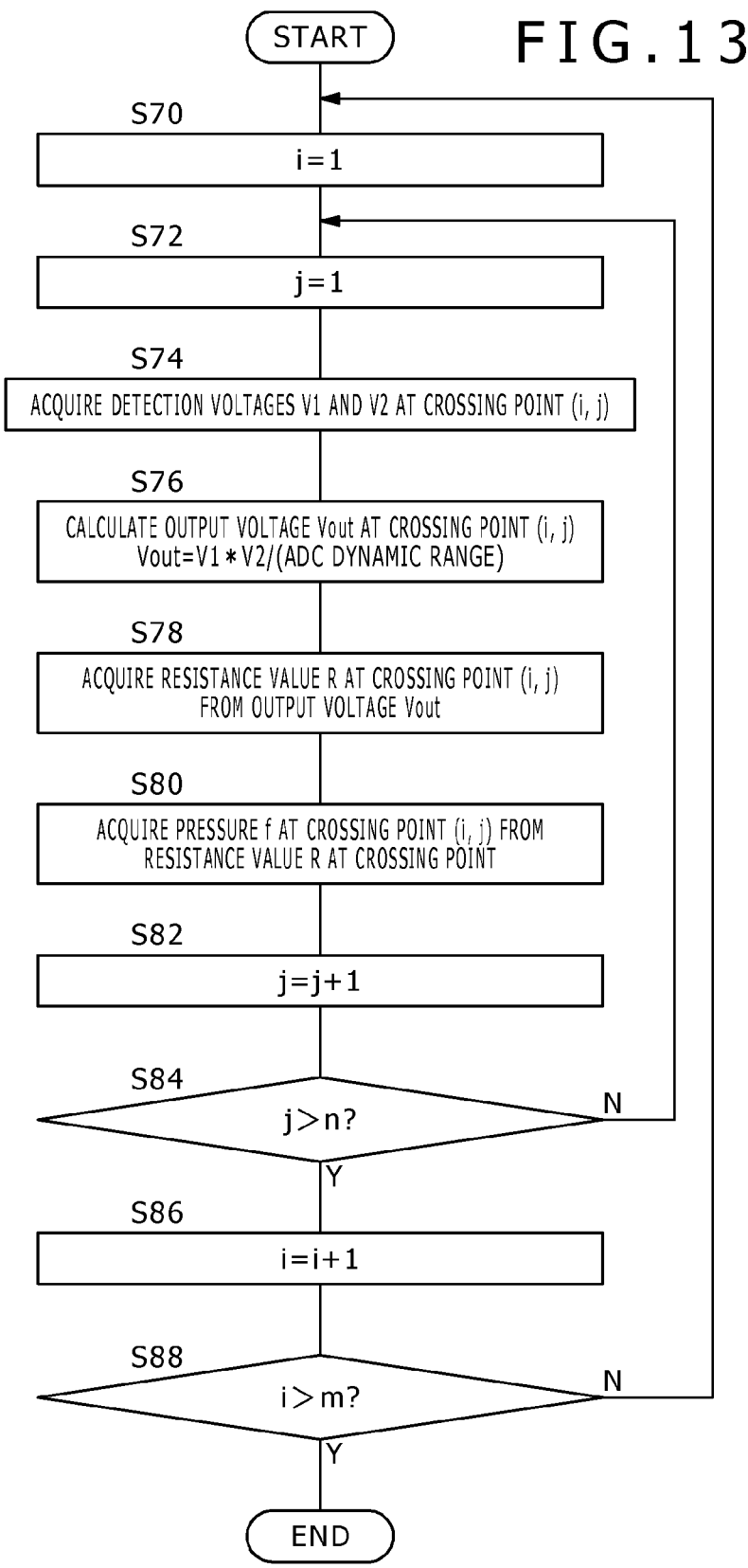
FIG. 13 is a flow chart illustrating a procedure of arithmetically operating an output voltage detected by the scanning at the first stage and an output voltage detected by the scanning at the second stage to determine a resistance value of and a pressure at a crossing point of a scanning target.

FIGS. 11 to 13 are flow charts illustrating a sensing procedure of the touch inputting device 110 of the present embodiment.

FIG. 11 is a flow chart illustrating a scanning procedure at the first stage.

A variable i for designating a drive line is initialized to 1 (S30). Another variable j for designating a sensing line is initialized to 1 (S32).

The driving unit 10 supplies a driving voltage Vcc to the drive line i and drives the other drive lines to 0 V (S34). The voltage detection unit 20 detects the output voltage V1 of the sensing line j, and the A/D conversion unit 30 A/D converts the detected output voltage V1 (S36). The detected output voltage V1 is retained into the output buffer 50.

The variable j for designating a sensing line is incremented by 1 (S38), and if the variable j is equal to or lower than n (N at S40), then the processing returns to S34 to repeat the steps from step S34 to step S38. If the variable j is higher than n (Y at S40), then the drive line i for designating a drive line is incremented by 1 (S42), and if the variable i is equal to or lower than m (N at S44), then the processing returns to step S32 to repeat the steps from step S32 to step S42. If the variable i is higher than m (Y at S44), then the processing is ended.

FIG. 12 is a flow chart illustrating a scanning procedure at the second stage.

The variable i for designating a drive line is initialized to 1 (S50). The variable j for designating a sensing line is initialized to 1 (S52).

The driving unit 10 supplies the driving voltage Vcc to the drive line i and sets the other drive lines to a Hi-Z state (S54). The voltage detection unit 20 detects the output voltage V2 of the sensing line j, and the A/D conversion unit 30 A/D converts the detected output voltage V2 (S56). The detected output voltage V2 is retained into the output buffer 50.

The variable j for designating a sensing line is incremented by 1 (S58), and if the variable j is equal to or lower than n (N at S60), then the processing returns to step S54 to repeat the steps from step S54 to step S58. If the variable j is higher than n (Y at S60), then the variable i for designating a drive line is incremented by 1 (S62), and if the variable i is equal to or lower than m (N at S64), then the processing returns to step S52 to repeat the steps from step S52 to step S62. If the variable i is higher than m (Y at S64), then the processing is ended.

FIG. 13 is a flow chart illustrating a procedure of arithmetically operating the output voltage V1 detected in the scanning at the first stage and the output voltage V2 detected in the scanning at the second stage to determine a final output voltage Vout and determining a resistance value and a pressure at a crossing point of a scanning target.

The variable i for designating a driving line is initialized to 1 (S70). The variable j for designating a sensing line is initialized to 1 (S72).

The arithmetically operating controlling unit 40 acquires the output voltage V1 detected in the scanning at the first stage and the output voltage V2 detected in the scanning at the second stage of the crossing point (i, j) from the output buffer 50 (S74). The arithmetically operating controlling unit 40 multiplies the detection voltage V1 at the first stage and the detection voltage V2 at the second stage and then divides the product by the dynamic range of the A/D conversion to calculate a final output voltage Vout from the crossing point (i, j) (S76).

The arithmetically operating controlling unit 40 calculates the resistance value R of the pressure-sensitive resistive element at the crossing point (i, j) from the driving voltage Vcc and the final output voltage Vout in accordance with the expression (2) given hereinabove (S78). The arithmetically operating controlling unit 40 determines the pressure f applied to the crossing point (i, j) from the resistance value R of the pressure-sensitive resistive element based on the f-R curve (S80).

The variable j for designating a sensing line is incremented by 1 (S82), and if the variable j is equal to or lower than n (N at S84), then the processing returns to step S74 to repeat the processes from step S74 to step S82. If the variable j is higher than n (Y at S84), then the variable i for designating a drive line is incremented by 1 (S86), and if the variable i is equal to or lower than m (N at S88), then the processing returns to step S72 to repeat the steps from step S72 to step S86. If the variable i is higher than m (Y at S88), then the processing is ended.

In the description given above, in the scanning at the first stage, the driving voltage Vcc is applied to a drive line of a scanning target while the other drive lines are driven to 0 V. However, even if a bias voltage Vbias which is lower than the driving voltage Vcc but is not equal to 0 is applied to the other drive lines, similar sensing can be implemented. A modification wherein the bias voltage Vbias is applied to the other drive lines is described with reference to FIG. 14.

FIG. 14(*a*) is a view illustrating the output voltage V1 detected in the scanning at the first stage in the modification wherein the driving voltage Vcc is applied to a drive line which is a scanning target and the bias voltage Vbias which is not equal to zero is applied to the other drive lines. FIG. 14(*b*) is an equivalent circuit to FIG. 14(*a*).

As depicted in FIG. 14(*a*), the driving voltage Vcc is applied to the drive line 1 and the bias voltage Vbias is applied to the drive line 4, and a resistor of 10 kΩ is connected as a pull-down resistor Rp to the sensing line 5. At this time, since the drive line 4 is driven by the bias voltage Vbias as depicted in FIG. 14(*b*), when the crossing point (1, 5) is not actually touched, the output voltage V1 is V1=Vbias×Rp/(Rp+R3). Here, if Vcc>Vbias, then the output voltage V1 does not exhibit a value equal to or higher than the bias voltage Vbias. Accordingly, even if a ghost touch is detected at the crossing point (i, j) (reference numeral 210), the output voltage V1 is suppressed to the bias voltage Vbias or less.

A voltage $V_{R(f1)}$=Vcc×Rp/(Rp+R(f1)) detected when the pressure-sensitive resistive element corresponding to the lowest pressure f1 to be detected has a resistance value R(f1) is determined in advance. If the bias voltage Vbias of the drive lines other than the drive line which is a scanning target is set so as to be equal to or lower than this voltage $V_{R(f1)}$, then when the output voltage V1 is equal to or lower than the bias voltage Vbias, the output voltage V1 originates from a ghost touch and a cancellation process for discarding the output voltage V1 can be carried out. The method of detecting the output voltage V2 in the scanning at the second stage is same as the method described hereinabove with reference to FIG. 10. The final output voltage Vout can be determined in accordance with the following expression.

$$Vout = V2 \times (V1 - Vbias)/(ADC \text{ dynamic range})$$

It is to be noted, however, that, in the case where Vout<0 is satisfied (namely, V1<Vbias is satisfied), Vout=0.

In this manner, also in the case of the modification wherein the bias voltage Vbias which is not equal to zero is applied to the other drive lines than a drive line which is a scanning target, a ghost touch can be canceled. However, it is to be noted that a weak touch whose pressure is up to the lowest pressure f1 to be detected given hereinabove is regarded as a ghost touch although the touch is carried out actually, and consequently, the output voltage V1 is canceled. Since a touch input of such a low pressure as just described generally is poor in the S/N ratio, where the S/N ratio is not favorable depending upon a use environment of the apparatus, for example, when the power supply noise is high, the modification described above is effective.

The present invention has been described in connection with the embodiment thereof. The embodiment is exemplary, and it can be recognized by those skilled in the art that various modifications are possible to the combination of the components or the processes and that also such modifications fall within the scope of the present invention.

From among the functional components provided in the touch inputting device controller 130, at least part of the functional components may be incorporated using the main processor 150 and the memory 160. For example, the function of the arithmetically operating controlling unit 40 may be incorporated in the main processor 150 and the output buffer 50 may be provided in the memory 160. In this case, the outputting unit 90 transmits the output voltage V1 detected in the scanning at the first stage and the output voltage V2 detected in the scanning at the second stage to the main processor 150. The main processor 150 carries out: the arithmetic operation for determining the final output voltage Vout from the detection voltages V1 and V2 at the first stage and the second stage, respectively; the arithmetic operation of determining the resistance value R of the pressure-sensitive resistive element at the cross point from the driving voltage Vcc and the final output voltage Vout; and the arithmetic operation of determining the pressure f applied to the crossing point from the resistance value R of the pressure-sensitive resistive element based on the f-R curve.

REFERENCE SIGNS LIST

10 Driving unit, 20 Voltage detection unit, 30 A/D conversion unit, 40 Arithmetically operating controlling unit, 50 Output buffer, 90 Outputting unit, 100 Touch input processing apparatus, 110 Touch inputting device, 120 Flexible board, 130 Touch inputting device controller, 140 Touch inputting device unit, 150 Main processor, 160 Memory.

INDUSTRIAL APPLICABILITY

The present invention can be utilized for a technology for controlling a touch inputting device.

The invention claimed is:

1. A touch inputting device controlling apparatus, comprising:

a touch inputting device including a plurality of conductor lines disposed in each of a first direction and a second direction and a pressure-sensitive resistive element provided at a location at which two of the conductor lines cross with each other;

a driving unit configured to successively select one drive line from among a plurality of drive lines provided as the conductor lines disposed in the first direction, and apply a driving voltage to the selected drive line;

a voltage detection unit configured to successively select one sensing line from among a plurality of sensing lines provided as the conductor lines disposed in the second direction, and detect an output voltage of the selected sensing line; and an arithmetic operation unit configured to determine a resistance value of the pressure-sensitive resistive element provided at the location at which the selected drive line and the selected sensing line cross with each other based on the driving voltage and the output voltage, wherein the driving unit applies a bias voltage equal to or lower than the driving voltage to the other drive lines than the selected drive line, the voltage detection unit carries out, when the voltage detection unit detects an output voltage equal to or lower than the bias voltage, a cancellation process of discarding the detection result a scanning operation, which includes supply of the driving voltage to the drive line and detection of the output voltage from the sensing line, is carried out at two stages such that the electric state to be applied to the other drive lines than the selected drive line differs between the scanning operation at the first stage and the scanning operation at the second stage, computing a final output voltage as proportional to a product of a first output voltage in the scanning operation at the first stage and a second output voltage detected in the scanning operation at the second stage, and a resistance value of the pressure-sensitive resistive element provided at the location at which the selected drive line and the selected sensing line cross with each other is determined based on the driving voltage and the final output voltage.

2. A touch inputting device controlling apparatus, comprising:

a touch inputting device including a plurality of conductor lines disposed in each of a first direction and a second direction and a pressure-sensitive resistive element provided at a location at which two of the conductor lines cross with each other;

a driving unit configured to successively select one drive line from among a plurality of drive lines provided as the conductor lines disposed in the first direction, and apply a driving voltage to the selected drive line;

a voltage detection unit configured to successively select one sensing line from among a plurality of sensing lines provided as the conductor lines disposed in the second direction, and detect an output voltage of the selected sensing line; and an arithmetic operation unit configured to determine a resistance value of the pressure-sensitive resistive element provided at the location at which the selected drive line and the selected sensing line cross with each other based on the driving voltage and the output voltage, wherein:

a scanning operation, which includes supply of the driving voltage to the drive line by the driving unit and detection of the output voltage from the sensing line by the voltage detection unit, is carried out at two stages such that the electric state to be applied to the other drive lines than the drive line selected by the driving unit differs between the scanning operation at the first stage and the scanning operation at the second stage, the arithmetic operation unit arithmetically operates a first output voltage detected by the voltage detection unit in the scanning operation at the first stage and a second output voltage detected by the voltage detection unit in the scanning operation at the second stage to determine a final output voltage, and determines a resistance value of the pressure-sensitive resistive element provided at the location at which the selected drive line and the selected sensing line cross with each other based on the driving voltage and the final output voltage in the scanning operation at the first stage, the voltage detection unit detects the first output voltage of the selected sensing line in a state in which the driving unit applies the bias voltage equal to or lower than the driving voltage to the other drive lines than the selected drive line, in the scanning at the second stage, the voltage detection unit detects the second output voltage of the selected sensing line in a state in which the driving unit places the other drive lines than the selected drive line in a high impedance state, the arithmetic operation unit arithmetically operates the first output voltage and the second output voltage to determine the final output voltage, and determines a resistance value of the pressure-sensitive resistive element provided at the location at which the selected drive line and the selected sensing line cross with each other based on the driving voltage and the final output voltage, when, in the scanning operation at the first stage, the voltage detection unit detects an output voltage equal to or lower than the bias voltage, the voltage detection unit carries out a cancellation process of discarding the detection result, and the arithmetic operation unit computes the final output voltage as proportional to a product of a first output voltage in the scanning operation at the first stage and a second output voltage detected in the scanning operation at the second stage.

3. A touch inputting device controlling method, comprising:

successively selecting, from within a touch inputting device including a plurality of conductor lines disposed in each of a first direction and a second direction and a pressure-sensitive resistive element provided at a location at which two of the conductor lines cross with each other, one drive line from among a plurality of drive lines provided as the conductor lines disposed in the first direction, and applying a driving voltage to the selected drive line;

successively selecting one sensing line from among a plurality of sensing lines provided as the conductor lines disposed in the second direction, and detecting an output voltage of the selected sensing line; and determining a resistance value of the pressure-sensitive resistive element provided at the location at which the selected drive line and the selected sensing line cross with each other based on the driving voltage and the output voltage, wherein a bias voltage equal to or lower than the driving voltage is applied to the other drive lines than the selected drive line, when an output voltage equal to or lower than the bias voltage is detected, a cancellation process of discarding the detection result is carried out, a scanning operation, which includes supply of the driving voltage to the drive line and detection of the output voltage from the sensing line, is carried out at two stages such that the electric state to be applied to the other drive lines than the selected drive line differs between the scanning operation at the first stage and the scanning operation at the second stage, computing a final output voltage as proportional to a product of a first output voltage in the scanning operation at the first stage and a second output voltage detected in the scanning operation at the second stage, and a resistance value of the pressure-sensitive resistive element provided at the location at which the selected drive line and the selected sensing line cross with each other is determined based on the driving voltage and the final output voltage.

4. A touch inputting device controlling method, comprising:

successively selecting, from within a touch inputting device including a plurality of conductor lines disposed in each of a first direction and a second direction and a pressure-sensitive resistive element provided at a location at which two of the conductor lines cross with each other, one drive line from among a plurality of drive lines provided as the conductor lines disposed in the first direction, and applying a driving voltage to the selected drive line;

successively selecting one sensing line from among a plurality of sensing lines provided as the conductor lines disposed in the second direction, and detecting an output voltage of the selected sensing line;

determining a resistance value of the pressure-sensitive resistive element provided at the location at which the selected drive line and the selected sensing line cross with each other based on the driving voltage and the output voltage, wherein a scanning operation, which includes supply of the driving voltage to the drive line and detection of the output voltage from the sensing line, is carried out at two stages such that the electric state to be applied to the other drive lines than the selected drive line differs between the scanning operation at the first stage and the scanning operation at the second stage, computing a final output voltage as proportional to a product of a first output voltage in the scanning operation at the first stage and a second output voltage detected in the scanning operation at the second stage, and wherein a resistance value of the pressure-sensitive resistive element provided at the location at which the selected drive line and the selected sensing line cross with each other is determined based on the driving voltage and the final output voltage.

5. A non-transitory, computer readable storage medium containing a computer program for causing a computer to carry out actions, comprising:

receiving, in a state in which, in a touch inputting device including a plurality of conductor lines disposed in each of a first direction and a second direction and a pressure-sensitive resistive element provided at a location at which two of the conductor lines cross with each other, a driving voltage is applied to a drive line successively selected from among a plurality of drive lines provided as the conductor lines disposed in the first direction and a bias voltage lower than the driving voltage is applied to the other drive lines than the selected drive line, an output voltage detected from a sensing line successively selected from among a plurality of sensing lines provided as the conductor lines disposed in the second direction;

determining a resistance value of the pressure-sensitive resistive element provided at the location at which the selected drive line and the selected sensing line cross with each other based on the driving voltage and the output voltage; and carrying out, when an output voltage equal to or lower than the bias voltage is detected, a cancellation process of discarding the detection result, wherein a scanning operation, which includes supply of the driving voltage to the drive line and detection of the output voltage from the sensing line, is carried out at two stages such that the electric state to be applied to the other drive lines than the selected drive line differs between the scanning operation at the first stage and the scanning operation at the second stage, computing a final output voltage as proportional to a product of a first output voltage in the scanning operation at the first stage and a second output voltage detected in the scanning operation at the second stage, and a resistance value of the pressure-sensitive resistive element provided at the location at which the selected drive line and the selected sensing line cross with each other is determined based on the driving voltage and the final output voltage.

6. A non-transitory, computer readable storage medium containing a computer program for causing a computer to carry out actions, comprising:

receiving, in a state in which, in a touch inputting device including a plurality of conductor lines disposed in each of a first direction and a second direction and a pressure-sensitive resistive element provided at a location at which two of the conductor lines cross with each other, a driving voltage is applied to a drive line successively selected from among a plurality of drive lines provided as the conductor lines disposed in the first direction, an output voltage detected from a sensing line successively selected from among a plurality of sensing lines provided as the conductor lines disposed in the second direction;

determining a resistance value of the pressure-sensitive resistive element provided at the location at which the selected drive line and the selected sensing line cross with each other based on the driving voltage and the output voltage, wherein a scanning operation, which includes supply of the driving voltage to the drive line and detection of the output voltage from the sensing line, is carried out at two stages such that the electric state to be applied to the other drive lines than the selected drive line differs between the scanning operation at the first stage and the scanning operation at the second stage, computing a final output voltage as proportional to a product of a first output voltage in the scanning operation at the first stage and a second output voltage detected in the scanning operation at the second stage, and wherein a resistance value of the pressure-sensitive resistive element provided at the location at which the selected drive line and the selected sensing line cross with each other is determined based on the driving voltage and the final output voltage.

* * * * *